March 19, 1968     M. C. HORNUNG     3,373,822

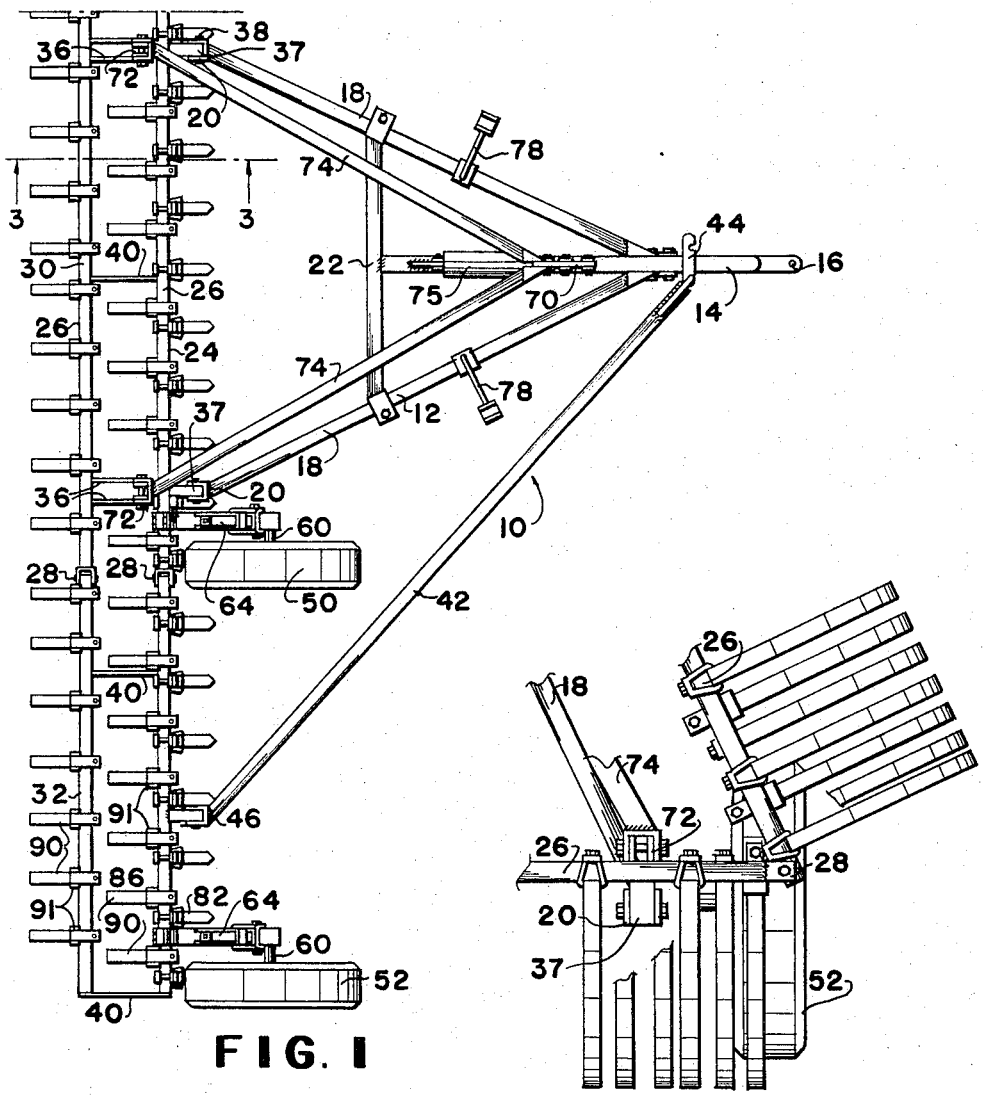
FIG. 1
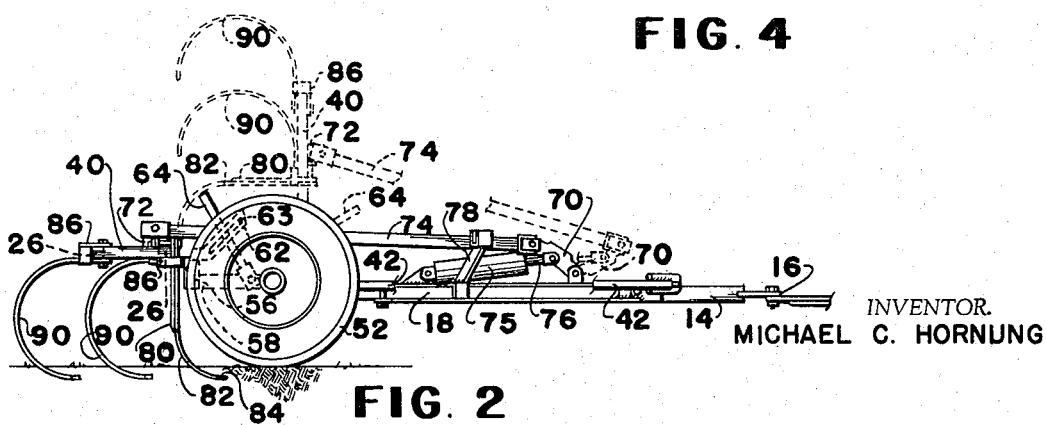
FIG. 4
FIG. 2
INVENTOR.
MICHAEL C. HORNUNG

AGRICULTURAL EARTH WORKING IMPLEMENT

Filed Feb. 17, 1965     2 Sheets-Sheet 2

*INVENTOR.*
MICHAEL C. HORNUNG

United States Patent Office 3,373,822
Patented Mar. 19, 1968

3,373,822
AGRICULTURAL EARTH WORKING
IMPLEMENT
Michael C. Hornung, Spearville, Kans. 67876
Filed Feb. 17, 1965, Ser. No. 433,442
2 Claims. (Cl. 172—311)

ABSTRACT OF THE DISCLOSURE

The invention is of a spring tooth farm implement used as a harrow, and having unique means of mounting and supporting the forwardly mounted blades so that they stand up well in use. In utilizing the invention a frame having a beam is employed with the frame being wheel supported for moving same. The beam mounts the working means. These are a row of spring teeth. The spring teeth have a substantially vertically positioned reinforcing member with means for mounting same on the beam. A blade is used which is positioned forward of and in close relationship to the reinforcing member. The blade has means to mount same on the beam in the upper end portion, and the lower portion of the blade in its end portion is pointed and designed for working the soil. The reinforcing member and the blade by its upper end portion are secured on the beam by a clamp. The clamp has a portion positioned on the side of the beam opposite the reinforcing member and blade, and the clamp has mounting means in one end portion which cooperates with that of the reinforcing member and the blade. The clamp has an encircling portion which is disposed about the reinforcing member and the blade. Mounting means such as a bolt and nut are connected to the mounting means of the reinforcing member, blade and clamp to secure the teeth to the beam. As a result the spring teeth are reinforced in use and clamped in position to resist shock and force upon striking objects in the ground.

---

This invention relates to agricultural earth working implements, more particularly to tractor drawn harrow-type implements having frames with folding end sections.

Modern farming methods and farming equipment are revolutionizing the farming industry. Farms in general have been increasing in size and thereby creating a demand for larger farm machinery. Agricultural earth working implements, and more particularly tractor drawn harrow-type implements are a basic farm implement which have also increased in size and which have been the subject of much development and improvement. As farm machinery increased in size greater difficulty was experienced in moving the machinery over public highways, through gates, etc. Various ways were found to make the implements foldable so as to narrow the width of the implement when traveling. The folding aspect of the implement frame presented many problems as to bracing, methods of folding, adjustment of the folding structure, etc. Some foldable type farm implements employ a relatively complex and expensive network of power cylinders, cables, winches, etc. in order to fold the relatively heavy frames. Many problems are also encountered with the implements known to the prior art in regard to adjusting the height or the working depth of the earth working means. This is particularly true in harrow-type implements. Normally harrow-type implements have frames provided with transverse beams or bars to mount the earth working means, which are normally spring teeth elements. A single bar or beam is adapted to hold only a single row of spring teeth. In order to provide a desired plurality of rows of teeth, a relatively large number of beams or bars must be provided which materially increases the size, weight and cost of the equipment. Further, by increasing the size and weight, the folding operation is made more complex.

I have invented a new implement. The implement of my invention has a forward frame means, and a rear frame positioned rearwardly of the forward frame. Means are provided for pivotally connecting the forward frame to the rear frame. A means is also provided for pivoting the rear frame relative to the forward frame. A plurality of spaced wheel means are secured to the rear frame with means to adjustably mount the wheel means. The means to adjustably mount the wheel means on the rear frame provides for an adjustment for varying the relative position of the rear frame and wheel means. Ground working means, preferably spring tooth elements, are mounted on the rear frame. The rear frame is adapted in use to be pivoted in use relative to the forward frame to thereby raise and lower the ground working means into and out of working engagement.

The implement of my invention solves many problems common to farm earth working implements known to the prior art. The implement of my invention is provided with a frame with two extending wing portions having earth working elements mounted thereon. In order to fold the implements of my invention, the rear elongated frame having the earth working means mounted thereon is pivoted upwardly to very nearly a vertical position and the two end wing sections pivoted forwardly. When the rear frame is pivoted to a vertical position, the end sections can be swung inwardly very easily since the pivotal axis is very nearly vertical. The farm implement of my invention is also provided with wheel means and a means to adjustably mount the wheel means on the frame. By providing an adjustable mounting means for the wheel means, the working depth of the ground working means, more preferably spring teeth, can be easily and quickly adjusted. With the adjustable means the inclination of the elongated rear frame can be easily and quickly adjusted. In my farm implement, a plurality of beams are normally provided in the rear frame. Two rows of spring teeth, made in accordance with my invention, can be mounted on a single beam thereby making possible a lighter, less complex, frame which is less expensive to manufacture and to manipulate in use.

An object of this invention is to provide a new agricultural earth working implement.

Another object of this invention is to provide a new harrow-type farm implement that can be quickly and easily folded for movement on highways, through gates, etc.

Still another object of this invention is to provide a new farm implement that is very rugged and sturdy, and yet light in weight.

Another object of this invention is to provide a spring tooth harrow implement provided with wheel means having a mounting means for the wheel means that provide quick, easy and simple adjustments thereof to adjust the working depth of the spring teeth.

Still another object of this invention is to provide a new spring tooth harrow implement having two rows of spring teeth mounted on a single beam.

Yet another object of this invention is to provide a new harrow-type farm implement in which the arrangement of the teeth and wheels can be quickly and easily varied.

Another object of this invention is to provide a new spring tooth which enables a plurality of rows of spring teeth to be mounted on a single beam.

Yet another object of this invention is to provide a new means for adjustably supporting a wheel means on a farm implement which can be manually adjusted.

Other objects and advantages of the new agricultural earth working implement of my invention will be apparent to those skilled in the art upon reading the disclosure. Drawings accompany and are a part of this disclosure. These drawings depict preferred specific embodiments of the new earth working implement of my invention, and it is to be understood that such drawings are not to unduly limit the scope of my invention. In the drawings, FIG. 1 is a top plan view of the preferred specific embodiment of the implement of my invention shown with a portion removed.

FIG. 2 is a side elevational view of the farm implement of my invention showing an alternate position of the rear frame in dotted lines.

FIG. 4 is a top plan view of a portion of the hinged rear frame shown in elevated position.

Figure 3:
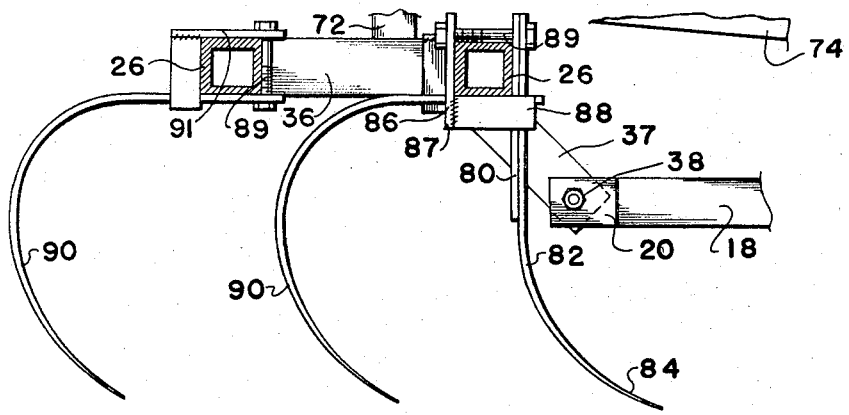
FIG. 3 is a view in cross section taken on line 3—3 of FIG. 1.

The following is a discussion and description of the new agricultural earth working implement of my invention made with reference to the drawings, wherein the same reference numerals are used to indicate the same or similar parts and/or structure. The discussion and description is of preferred specific embodiments of the new implement of my invention, and it is to be understood that such is not to unduly limit the scope of my invention.

Referring now to FIGS. 1 through 10 of the drawings, and more particularly to FIGS. 1 and 2, there is shown a specific embodiment of my invention of a tractor drawn harrow-type farm implement 10. The farm implement 10 of my invention has a generally horizontally disposed A-frame 12 having a tongue 14, provided with an aperture 16 to facilitate connection of the tongue 14 to a tractor or other pulling vehicle. Two opposed diverging elongated members 18 constitute part of A-frame 12. Each of the diverging members 18 has one end connected to an intermediate portion of tongue 14 and is provided with a bifurcated element 20 with aligned apertures therein. A cross bar 22 is connected to the intermediate portions of elongated members 18 and also to the rear end of tongue 14.

An elongated foldable frame 24 is pivotally connected to A-farme 12. Elongated frame 24 has two spaced parallel beams 26, preferably having a square transverse cross sectional configuration, with two hinges 28 dividing the beams 26 into center portions and end portions. The elongated foldable frame 26 is comprised of a center section 30 and two end wing sections 32. The hinge means 28 which pivotally connects the various portions of beam 26 is shown in detail in FIG. 10. The hinge means 28 has a bifurcated portion 34 provided with aligned apertures and a bolt 35 disposed in the aligned apertures and extending through beam 26. The two center portions of beams 26 are connected together by connecting bars 36, which are positioned adjacent the hinges 28, as more clearly shown in FIG. 1 of the drawings. The connecting bars are positioned on frame 24 with a portion 37 extending forwardly of the forward beam. Apertures are provided in the extending portions 37 of connecting bars 36. Pin means 38 pivotally secure the extending portions 37 of bars 36 to the bifurcated portions 20 on the ends of the diverging members 18 of A-frame 12. It can be seen that this structure pivotally connects A-frame 12 to elongated foldable frame 24. Cross members 40 are also provided for joining the end portions of beams 26 to form the wing sections 32 of frame 24. A cross bar 40 can also be provided in the center portion of the center section of frame 26.

A diagonal brace means 42 is provided for the wing sections 32. The diagonal brace means is connected at one end to a hook 44, mounted on tongue 14 of the A-frame, and is provided at the other end with a bifurcated portion 46 which is in turn pivotally connected to the wing sections 32 of the frame 24. The axis of the pin securing brace 42 to the wing section is aligned with the pins 37 securing the A-frame to the center section of the elongated frame. This arrangement allows the rear elongated frame to be pivoted relative to the A-frame.

Support means are provided for movably supporting the elongated frame. This support means includes a first set of wheel means 50 adjustably mounted on the end portions of the center section of the elongated frame 24, and a second set of wheel means 52 adjustably mounted on the opposite wing sections 32 of the elongated frame. A mechanism is provided for adjustably supporting the wheel means on the elongated frame. This mechanism includes a clamp 54 rigidly secured to the forward beam of the elongated frame, a downwardly extending bifurcated portion 56 having aligned apertures therein joined to the clamp means 54. The clamp can be shifted along beam 26 to accommodate for various spacing of the earth working means also mounted on the beam. A wheel support bar 58 is pivotally joined at one end by pin 59 to bifurcated portion 56 and is provided at the other end with a transversely extending wheel shaft 60. An upwardly inclined camming beam 62 is shown mounted on clamp means 54. The upwardly inclined camming beam 62 is provided with an elongated longitudinally extending slot 63. A support rod 64 has a lower end pivotally secured to the wheel bar 58 adjacent wheel shaft 60, and a bolt means mounted on the support rod which is slidably positioned in groove 63 of camming beam 62. Preferably the bolt means has a handle 65 or the like which can be used to tighten same to secure said support rod in a desired position relative to the camming beam 62. Preferably a plurality of holes 66 is provided in the connecting rod 64 to make possible a number of differing ranges of adjustments. It can be seen that the relative position of the wheel support bar 58 and the elongated frame 24 can be varied by merely loosening the bolt 67, moving the upper end of the rod to position the bolt in a new location in groove 63 of camming beam 62, and re-tightening bolt 67. This adjustment can be very easily performed manually since the camming beam provides a mechanical advantage.

A mean is provided to pivot the elongated frame 24 relative to the A-frame 12. This means includes a lever arm 70 mounted on the tongue 14 of A-frame 12, two upwardly projecting elements 72 mounted on the connecting bar 36 of the elongated frame 24, and two diverging link means 74. Each of the link means are pivotally connected at one end to lever 70 and at the other end to one of the upwardly projecting elements 72. A hydraulic cylinder 75 is mounted on tongue 14 and is provided with a piston rod 76 connected to the intermediate portion of lever arm 70. It can be seen that hydraulic cylinder 75 can be used to move lever 70 with the movement being conveyed to the rear frame 24 with the link means 74. Movement of the piston 76 thereby pivots the rear frame relative to the A-frame 12, as illustrated in the dotted lines of FIG. 2 of the drawings. In order to fold the rear frame 24, the frame is pivoted upwardly with the hydraulic cylinder 75 until it is very nearly vertical. The bifurcated ends of braces 42 are disconnected from the wing sections 32 and the wing sections folded forwardly and deposited in brackets 78 on the A-frame. The folding is easily accomplished because the axes of the hinges 28 on frame 24 are very nearly vertical.

Suitable ground working means are mounted on the transversely extending beams 26 of the elongated frame 24. Preferably three rows of spring teeth are mounted on the two beams 26, as more clearly illustrated in FIG. 3 of the drawings. As indicated two rows of spring teeth are mounted on the front beam and a single row on the rear beam. The spring teeth in the first row are of unique construction. Each of the spring teeth in the first row has an elongated straight flat vertically extending resilient reinforcing bar 80 having an aperture in the upper end, a blade element 82 having an elongated staright and flat upper portion positioned in close relationship to the flat reinforcing bar 80, which also has an aperture in the upper end aligned with the aperture in the reinforcing bar 80, and an arcuate shaped lower portion having a sharp pointed end 84. A clamp means 86, shown more clearly in FIG. 9 of the drawings secures the reinforcing bar and blade element to the beam 26. The clamp means 86 has a short flat portion 87 positioned on the side of beam 26 opposite reinforcing bar 80 and blade element 82, which is provided with an aperture in the upper end, and a transverse encircling portion 88 disposed about the bar 80 and blade element 82. A bolt 89 is disposed in the apertures in top portion 86 reinforcing bar 80 and blade element 82 to securely mount the tooth element to the beam. The tooth element can be shifted along the beam 26 if desired, to provide different arrangements of teeth. The second and third rows are arcuate shaped spring teeth 90. Teeth 90 are secured to the beams 26 with clamping members 91 which are very similar to clamp members 86, except that the encircling portions 93 are somewhat smaller since they do not encompass reinforcing bars as do clamps 86. It can be seen from FIG. 3 that the first and second rows of spring teeth assume a spaced relation in spite of the fact that both rows are mounted on the same bar. This novel tooth arrangement and structure makes possible a lighter less cumbersome and less expensive frame since it overcomes the necessity of providing a bar for every row of teeth as is conventional in the prior art. If desired the beams 26 in frame 24 can be circular in transverse cross section, or some other suitable form of cross section, and the spring teeth clamping portions shaped accordingly. In the implement of my invention it can be seen that the spring tooth elements as well as the wheels can be shifted laterally very easily and simply. This allows the use of different arrangements, and different types of ground working means on the implement of my invention.

Figures 5, 8:
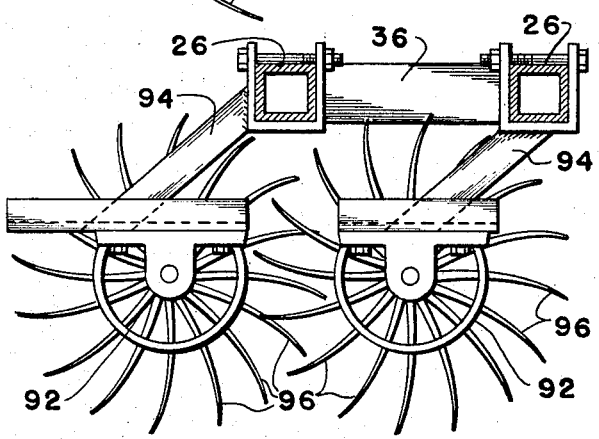
FIG. 5 is a view in cross section illustrating rotary ground working elements mounted on the implement frame of my invention.
FIG. 8 is a detail view in enlarged section of the connection means mounting the rear spring teeth to an elongated member of my frame.
Figures 6, 7, 9:
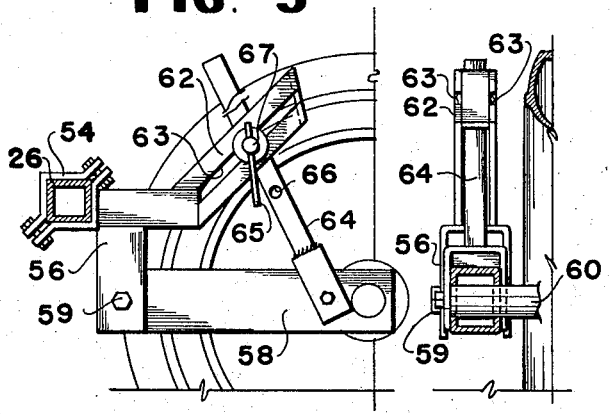
FIG. 6 is a detail view in enlarged scale showing the adjustable support for the wheel means.
FIG. 7 is an end view in broken section of the support means for the wheel means shown in FIG. 6.
FIG. 9 is a detail view in enlarged scale in broken section illustrating the specific clamp construction for mounting the spring teeth of the front row on my elongated frame of my invention.
Figure 10:
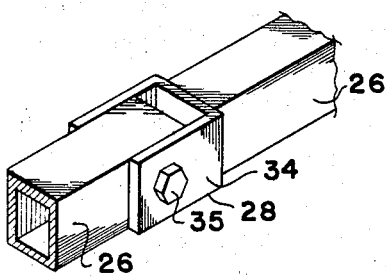
FIG. 10 is a detailed view in enlarged section illustrating the hinge means used to pivotally connect the elongated beams of the elongated frame.

In FIG. 5 is illustrated still another preferred embodiment of a ground working means which can be mounted on the frame of the implement of my invention. The ground working means shown in FIG. 5 are comprised of two rows of rotary elements 92 secured respectively to the beams by a mounting 94. The mounting 94 includes a clamp means which enables the elements 92 to be shifted on the frame. The rotary elements 92 are provided with a plurality of radially projecting sharp teeth 96.

As will be obvious to those skilled in the art, various changes and modifications of the preferred implement of my invention as described can be made or followed without departing from the spirit of the disclosure or the scope of the claims.

I claim:
1. A farm implement comprising, a generally horizontally disposed A-frame having a tongue, two opposed diverging members connected to said tongue, and a cross bar connected to the intermediate portions of said diverging members and to said tongue, an elongated frame pivotally joined to said A-frame having a center section and two foldable wing sections comprising, two spaced parallel beams arranged with one of said beams in a forward position and the other of said beams in a rear position, hinge means on each of said beams dividing same into a center portion and end portions, two spaced connecting bars joined to said center portions of said beams, means pivotally joining said connecting bars to the ends of said diverging members of said A-frame, and means connecting said end portions of said parallel beams in rigid relation, brace means for each of said wing sections of said elongated frame, each brace means joined at one end to said wing section and at the other end of said A-frame, support means for movably supporting said elongated frame comprising, a first set of wheels mounted on the center section of said elongated frame, and a second set of wheel means mounted on the wing sections of said elongated frame, means for adjustably supporting said wheel means on said elongated frame, each of said last-mentioned means comprising, a clamp means secured to the forward beam of said elongated frame, a forwardly extending wheel support bar provided at one end with a transversely extending wheel shaft, means pivotally mounting the other end of said wheel support bar to said clamp means, said wheel support bar positioned in forwardly extending relation with said wheel shaft positioned forward of said means pivotally joining the A-frame and connecting bars, an upwardly inclined camming beam mounted on said clamp means overlying said wheel support bar, a support rod having a lower end pivotally secured to said wheel support bar, and means slidably connecting said support rod to said camming beam, a means to pivot said elongated frame relative to said A-frame comprising, a lever arm mounted on the tongue of said A-frame, an upwardly projecting element mounted on said elongated frame, link means connected at one end to said lever arm and at the other end to said upwardly projecting element on said elongated frame, and a hydraulic cylinder mounted on said A-frame and operatively connected to said lever arm for actuation thereof, and ground working means secured on said beams of said elongated frame and comprised of three spaced rows of spring teeth with the first and second of said rows of teeth secured to the forward beam of said elongated frame, and the third row of teeth secured to the rear beam of said elongated frame, with each spring tooth of said first row of spring teeth comprised of, an elongated straight flat vertically etxending resilient reinforcing bar having an aperture in the upper end, a blade element having an elongated straight and flat upper portion positioned in close relationship to said flat reinforcing bar and having an aperture in the upper end thereof, and an arcuate shaped lower portion having a sharp pointed end, a clamp means for securing said reinforcing bar and said blade element to the forward beam of said elongated frame, said clamp means having a short flat portion positioned on the side of said beam opposite said reinforcing bar and blade element and having an aperture in the upper end thereof, a transverse encircling portion on the lower end disposed about the said bar and said blade element, and a bolt means disposed in the apertures of said reinforcing bar, blade element and said flat portion securing said spring tooth to said beam of said elongated frame, and with each spring tooth in said second row of spring teeth comprised of an arcuate shaped blade having a lower sharp pointed end, and a' clamp means for securing said arcuate shaped blade to the forward beam of said elongated frame, said farm implement adapted in use to raise and lower said ground working means when said elongated frame is pivoted relative to said A-frame, and the working depth of the ground working means manually adjusted, by moving said support rod relative said camming beam to thereby pivot said wheel support bar.

2. A farm implement comprising, a generally horizontally disposed A-frame having a tongue, two opposed diverging members connected to said tongue, an elongated frame pivotally joined to said A-frame having a center section and foldable wing sections comprising, at least two spaced substantially parallel beams arranged with one of said beams in a forward position and another of said beams in a rear position, hinge means on said beams dividing same into a center portion and end portions, connecting means joined to said center portions of said beams, means pivotally joining said connecting means to end portions of said diverging members of said A-frame, and means connecting said end portions of said parallel beams in substantially rigid relation, support means for movably supporting said elongated frame comprising, a first set of wheels mounted on the center section of said elongated frame, and a second set of wheel means mounted on the wing sections of said elongated frame, means for adjustably supporting said wheel means on said elongated frame, each of said means for adjustably supporting said wheel means comprising, clamp means secured to the forward beam of said elongated frame, a forwardly extending wheel support means provided at one end with a transversely extending wheel shaft, means pivotally mounting the outer end of said wheel support means to said clamp means, said wheel support means positioned in forwardly extending relation with said wheel shaft positioned forward of said means pivotally joining the A-frame and connecting means, upwardly inclined camming means mounted on said clamp means overlying said wheel support means, a support means having a lower end pivotally secured to said wheel support means, and means adjustably connecting said support means to said camming means, means to pivot said elongated frame relative to said A-frame comprising, lever means mounted on the tongue of said A-frame, an upwardly projecting element mounted on said elongated frame, link means connected in one end portion at one end to said lever means and in the other end portion to said upwardly projecting element on said elongated frame, and actuating means mounted on said A-frame and operatively connected to said lever means for actuation thereof, and ground working means secured on said beams of said elongated frame and comprised of at least three spaced rows of spring teeth with the first and second of said rows of teeth secured to the forward beam of said elongated frame, and a third row of teeth secured to one of the rear beams of said elongated frame, with each spring tooth of said first row of spring teeth comprised of, an elongated substantially straight flat vertically extending resilient reinforcing bar having mounting means in the upper end portion, a blade element having an elongated substantially straight and flat upper portion positioned in close relationship to said reinforcing bar and having mounting means in the upper end portion thereof, and an arcuate shaped lower portion having an earth working end, clamping means for securing said reinforcing bar and said blade element to the forward beam of said elongated frame, and with each spring tooth in the second row of spring teeth comprised of an arcuate shaped blade having a lower earth working end, and clamp means securing said arcuate shaped blade to the forward beam, said farm implement adapted in use to raise and lower said ground working means when said elongated frame is pivoted relative to said A-frame, and the working depth of the ground working means manually adjusted by moving said support means relative said camming means to thereby pivot said wheel support means.

References Cited

UNITED STATES PATENTS

| | | | |
|---|---|---|---|
| 251,900 | 12/1882 | La Dow | 172—707 X |
| 255,006 | 3/1882 | Murray | 172—707 X |
| 2,664,040 | 12/1953 | Beard | 172—548 |
| 2,958,383 | 11/1960 | Danielson | 172—456 |
| 3,077,231 | 2/1963 | Hamilton | 172—421 |
| 3,190,367 | 6/1965 | Kopaska | 177—456 |

FOREIGN PATENTS

| | | | |
|---|---|---|---|
| 256,934 | 10/1911 | Germany. | |
| 1,936 | 1903 | Great Britain. | |
| 633,740 | 12/1949 | Great Britain. | |

ABRAHAM G. STONE, *Primary Examiner.*

J. R. OAKS, *Assistant Examiner.*